(12) United States Patent
Watson et al.

(10) Patent No.: US 11,880,015 B2
(45) Date of Patent: Jan. 23, 2024

(54) MODELING TROPICAL CYCLONE SURFACE FIELDS FOR IMPACT ASSESSMENT

(71) Applicant: International Business Machines Corporation, Armonk, NY (US)

(72) Inventors: Campbell D Watson, Brooklyn, NY (US); Etienne Eben Vos, Johannesburg (ZA); Komminist Weldemariam, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 229 days.

(21) Appl. No.: 17/341,349

(22) Filed: Jun. 7, 2021

(65) Prior Publication Data

US 2022/0390647 A1 Dec. 8, 2022

(51) Int. Cl.
| | | |
|---|---|---|
| *G01W 1/10* | (2006.01) | |
| *G01W 1/14* | (2006.01) | |
| *G01W 1/16* | (2006.01) | |
| *G06N 3/08* | (2023.01) | |
| *G06V 10/75* | (2022.01) | |
| *G06F 18/22* | (2023.01) | |
| *G06F 18/214* | (2023.01) | |
| *G01W 1/06* | (2006.01) | |

(52) U.S. Cl.
CPC .............. *G01W 1/10* (2013.01); *G01W 1/06* (2013.01); *G01W 1/14* (2013.01); *G06F 18/2148* (2023.01); *G06F 18/22* (2023.01); *G06N 3/08* (2013.01); *G06V 10/758* (2022.01)

(58) Field of Classification Search
None
See application file for complete search history.

(56) References Cited

U.S. PATENT DOCUMENTS 7,844,427 B1 * 11/2010 Crawford ................ G01W 1/10
702/3
10,740,684 B1 8/2020 Wani

FOREIGN PATENT DOCUMENTS

| CN | 102109619 A | 6/2011 |
| CN | 109086540 A | 12/2018 |
| WO | 2020151226 A1 | 7/2020 |

OTHER PUBLICATIONS

Chen et al. "Machine Learning in Tropical Cyclone Forecast Modeling: A Review." 2020, Atmosphere, 11, 676-705 (Year: 2020).*
Tan et al. "Mapping the Wind Hazard of Global Tropical Cyclones with Parametric Wind Field Models by Considering the Effects of Local Factors" 2018, International Journal of Disaster Risk Science. 9 (Year: 2018).*

(Continued)

*Primary Examiner* — Roy Y Yi
(74) *Attorney, Agent, or Firm* — Edward Wixted; Otterstedt & Kammer PLLC (57) ABSTRACT

Train a machine learning model, using an image-based knowledge graph of tropical cyclone data, for implementing a surface field modeling architecture that produces images of at least surface wind fields and surface rainfall fields from images of at least tropical cyclone tracks and pressure intensities. Generate model images of a modeled surface wind field and a modeled surface rainfall field by providing images of at least a user-generated tropical cyclone track and pressure intensity to the trained machine learning model.

20 Claims, 8 Drawing Sheets

(56) References Cited

OTHER PUBLICATIONS

Peter Mell et al., "The NIST Definition of Cloud Computing". Special Publication 800-145. NIST. Sep. 2011, pp. 1-7.
John E. Kelly III, "Computing, cognition, and the future of knowing", IBM Corp. Oct. 2015. pp. 1-7.
Ian J. Goodfellow et al., "Generative adversarial nets", arXiv:1406.2661v1. Jun. 2014. pp. 1-9.
Wei Wang et al., "Recurrent U-Net for Resource-Constrained Segmentation," Proc. ICCV 2019 (IEEE), Oct. 2019, pp. 1-10.
Nadia Bloemendaal et al., "Generation of a global synthetic tropical cyclone hazard dataset using STORM." Scientific Data 2020, 7:40. https://www.nature.com/articles/s41597-020-0381-2. Feb. 2020. pp. 1-12.
Josh Bregy et al., "Spatiotemporal Variability of Tropical Cyclone Precipitation Using a High-Resolution, Gridded (0.25° × 0.25°) Dataset for the Eastern United States, 1948-2015." Journal of Climate 33(5). Mar. 2020. pp. 1-18.
Sophie Gifford-Roisin et al., "Tropical Cyclone Track Forecasting using Fused Deep Learning from Aligned Reanalysis Data." Front. Big Data—Data-driven Climate Sciences, arXiv:1910.10566v2. Jan. 2020. pp. 1-23.

\* cited by examiner

MODELING TROPICAL CYCLONE SURFACE FIELDS FOR IMPACT ASSESSMENT

BACKGROUND

The present invention relates to the electrical, electronic, and computer arts, and more specifically, to applications of machine learning.

Presently, tropical cyclones are modeled by computationally-intensive physics-based modeling (the state of the art) or by statistical analysis (an older method). Of the two approaches, statistical analysis particularly depends upon availability of historical data while physics-based modeling depends upon precise and accurate understanding of the intensely complex rules governing behavior of air and vapor masses and their interactions with surface features. When considering the potential impact of a tropical cyclone upon a land area with no historical data or sparse historical data, a statistical model is unlikely to give meaningful predictions. The physics-based models are more likely to give close-to-accurate results for areas without sufficient history, but require large commitments of compute resources and expertly defined initial conditions in order to converge to a result in a reasonable amount of time.

SUMMARY

Principles of the invention provide techniques for modeling tropical cyclone surface fields for impact assessment. In one aspect, an exemplary method includes training a machine learning model, using an image-based knowledge graph of tropical cyclone data, for implementing a surface field modeling architecture that produces images of at least surface wind fields and surface rainfall fields from images of at least tropical cyclone tracks and pressure intensities; and generating model images of a modeled surface wind field and a modeled surface rainfall field by providing images of at least a user-generated tropical cyclone track and pressure intensity to the trained machine learning model.

One or more embodiments of the invention or elements thereof can be implemented in the form of a computer program product including a computer readable storage medium with computer usable program code for facilitating the method steps indicated. Furthermore, one or more embodiments of the invention or elements thereof can be implemented in the form of a system (or apparatus) including a memory that embodies computer executable instructions, and at least one processor that is coupled to the memory and operative by the instructions to facilitate exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a tangible computer readable storage medium (or multiple such media) and implemented on a hardware processor, or (iii) a combination of (i) and (ii); any of (i)-(iii) implement the specific techniques set forth herein.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

In view of the foregoing, techniques of the present invention can provide substantial beneficial technical effects. For example, one or more embodiments provide one or more of:

Close-to-accurate predictions of tropical cyclone surface fields on sparse or absent historical data, with reduced investment of computer resources, thus improving the technological process of computerized modeling of tropical cyclone surface fields for impact assessment.

Close-to-accurate predictions of tropical cyclone surface fields for a given location without reliance on physics-based modeling.

Close-to-accurate predictions of tropical cyclone surface fields for a given location without reliance on historical data for that location.

Close-to-accurate predictions of tropical cyclone surface fields for a given location covering a wide range of probable scenarios.

Ensure temporally-coherent spatial fields using machine learning techniques.

Generate a hazard risk maps of tropical cyclone damage using machine learning.

Modify operations and planning activities of a public utility by infusing generated hazard risk maps into automated public utility controls.

These and other features and advantages of the present invention will become apparent from the following detailed description of illustrative embodiments thereof, which is to be read in connection with the accompanying drawings.

DETAILED DESCRIPTION

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
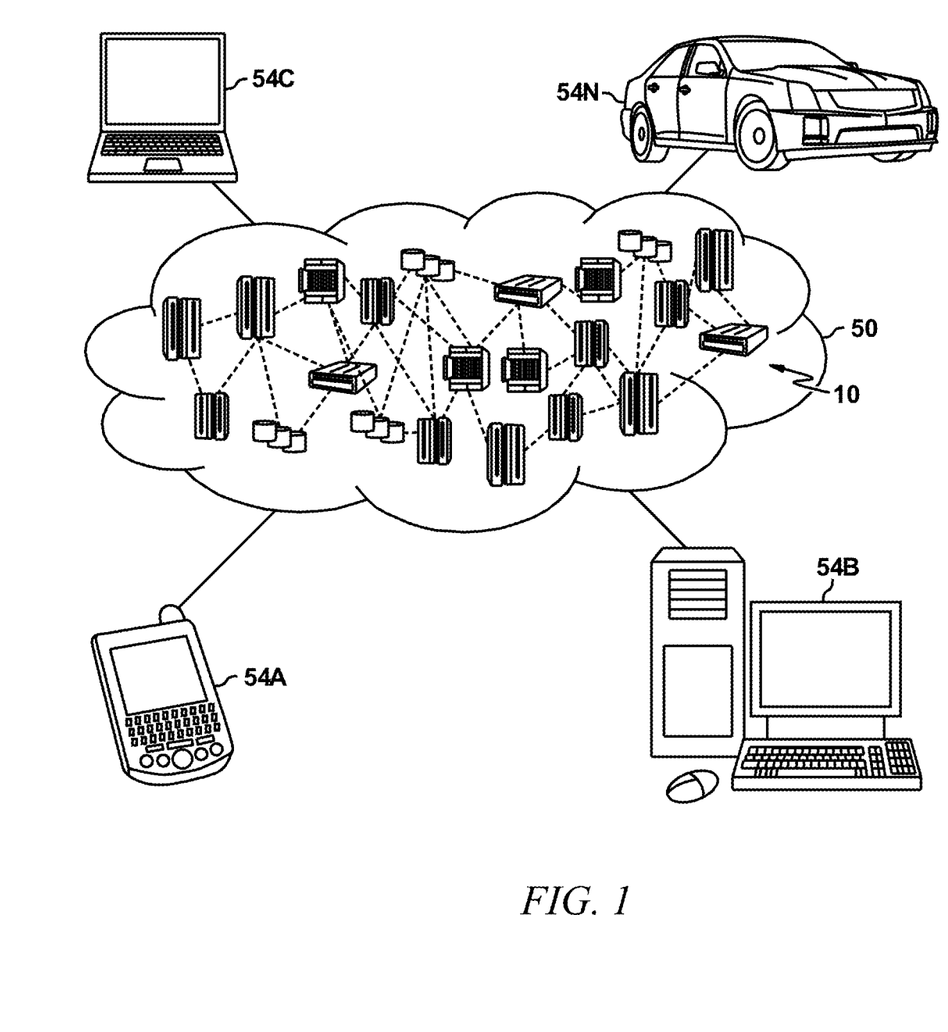
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
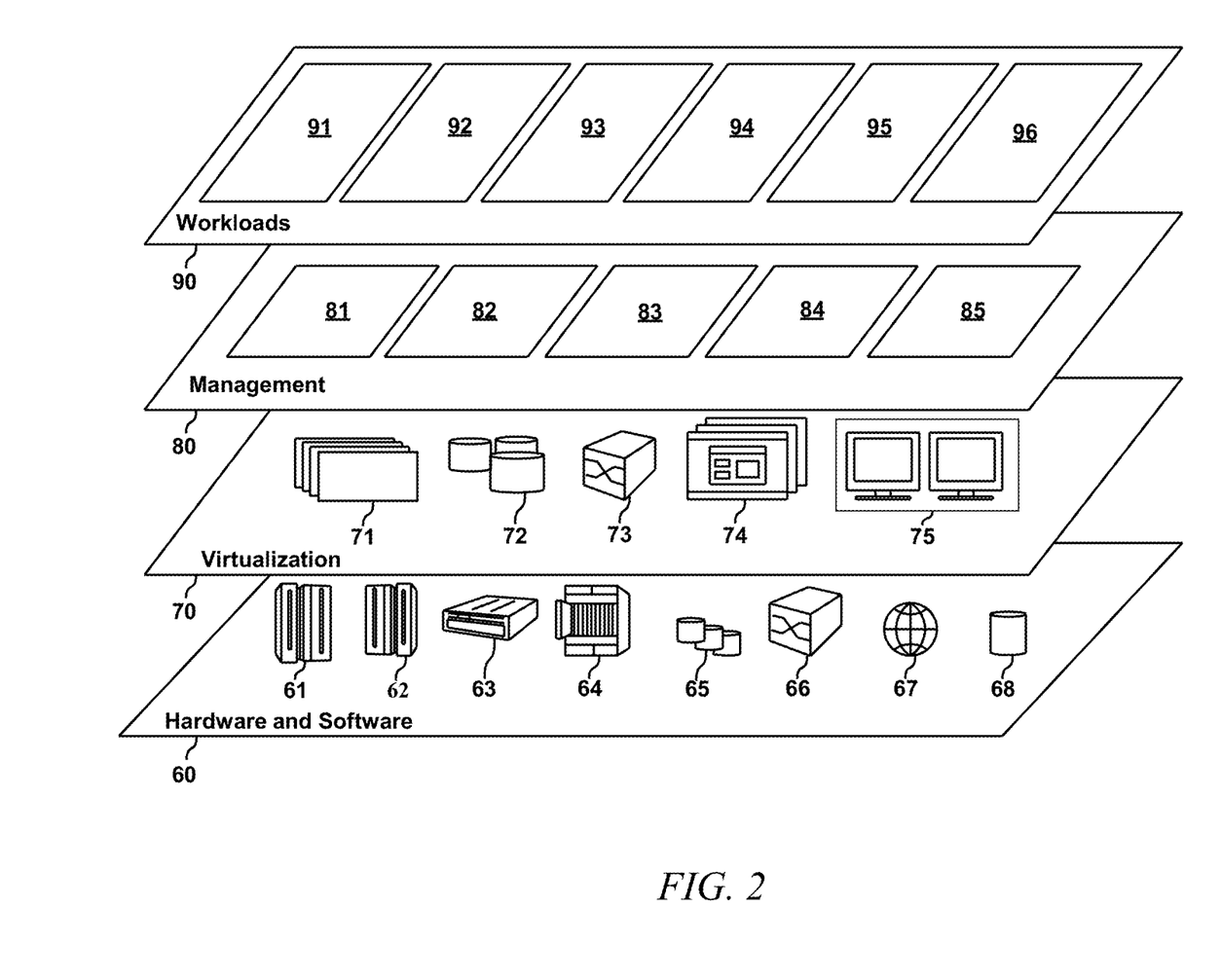
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a tropical cyclone surface field generating model 96.

Generally, a neural network includes a plurality of computer processors that are configured to work together to implement one or more machine learning algorithms. The implementation may be synchronous or asynchronous. In a neural network, the processors simulate thousands or millions of neurons, which are connected by axons and synapses. Each connection is enforcing, inhibitory, or neutral in its effect on the activation state of connected neural units. Each individual neural unit has a summation function which combines the values of all its inputs together. In some implementations, there is a threshold function or limiting function on at least some connections and/or on at least some neural units, such that the signal must surpass the limit before propagating to other neurons. A neural network can implement supervised, unsupervised, or semi-supervised machine learning.

Figure 3:
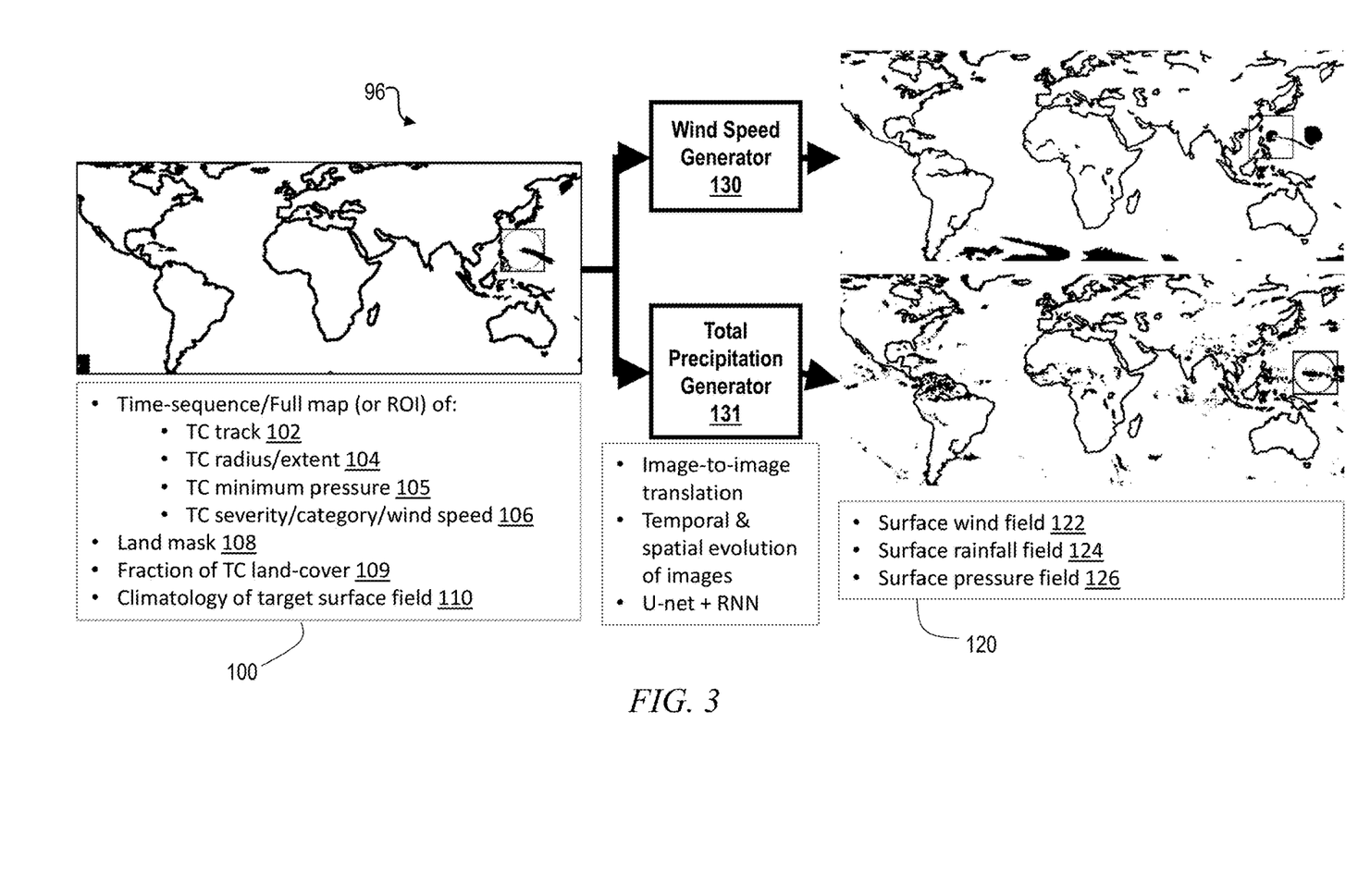
FIG. 3 depicts, in a schematic, inputs and outputs from a tropical cyclone surface field generating model, according to an exemplary embodiment.

FIG. 3 depicts, in a schematic, inputs and outputs from a tropical cyclone surface field generating model 96. The inputs 100 include a time sequence (on a full map or for a region of interest) of a tropical cyclone's track 102, radius or extent 104, minimum central pressure 105, and severity/category/maximum wind speed 106. The minimum central pressure value 105 helps to characterize the intensity of the cyclone. The inputs 100 also include a land mask 108. Land mask 108, in one or more embodiments, is a digital representation of the shape of the shoreline—in this case, not only the shape/edge of the shoreline, but a digital representation that shows all the grid-points in a map where there is land. This is, for example, a map including zeroes and ones. Wherever there is land, the value of the grid-point will be a first value (e.g., 1), and everywhere where there is an ocean/lake/large river/another body of water, the value will be a different value (e.g., 0). The inputs 100 also include a fraction of tropical cyclone land coverage 109, and baseline climatology 110 of the area covered by the tropical cyclone extent 104. The outputs 120 can include one or more time sequences of a surface wind field 122, a surface rainfall field 124, and optionally a surface pressure field 126. The output is one or more of these fields. Note: There are other fields that could be output, such as cloud reflectivity, wind gusts, etc. The model 96 includes at least a wind speed generator 130 and a precipitation generator 131. Optionally, the model 96 includes a pressure field generator (not shown).

Figure 4:
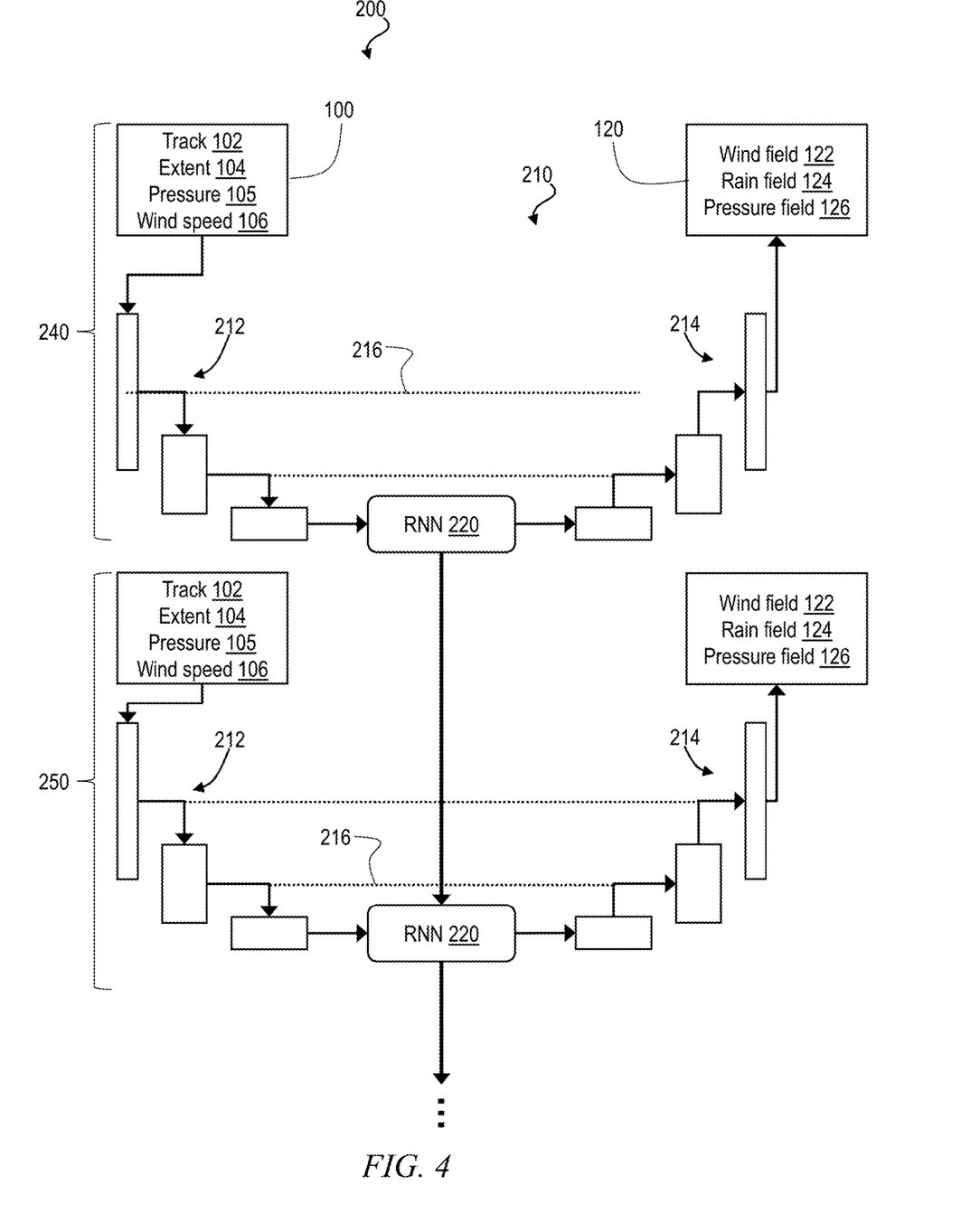
FIG. 4 depicts, in a schematic, an architecture usable by a wind speed generator and a total precipitation generator of the model of FIG. 3, according to an exemplary embodiment.

FIG. 4 depicts, in a schematic, an architecture 200 that is usable by the wind speed generator 130 and the precipitation generator 131 of the model 96 shown in FIG. 3. The architecture 200 includes a convolutional encoder/transpose convolutional decoder (U-net) 210 of convolutional layers 212 and deconvolving layers 214, combined with a recurrent neural network (RNN) 220. In one or more embodiments, there are three convolutional layers 212 and three deconvolving layers 214. The U-net includes skip connections 216 between corresponding convolutional layers 212 and deconvolving layers 214 to partly preserve lower-level features. Low-level spatial features refer to details such as lines, edges, blobs, dots etc. of an image, or in this case a map/surface field, such as the shape of the shoreline or, presumably, large regions with similar values for a surface field. These features are learned by a ML model in the initial layers. Higher level features (that are composed of multiple low-level features) are learned by deeper layers in the network. An advantage of adding skip connections between the corresponding encoder and decoder layers of a U-net is that such connections gives deeper layers direct access to low-level features (or features of the same dimensionality), which means that the entire network does not have to learn and encode those features in order to reproduce them at the output. Such a model can use its capacity to learn the high-level features that are needed to achieve the task (like segmentation, or predicting accurate/plausible values for a surface field) and then use those high-level features in conjunction with the features of similar dimensionality that it receives from the encoder.

The convolutional layers 212 flow from the inputs 100 to the RNN 220, and the deconvolving layers 214 flow from the RNN 220 to the outputs 120. The RNN 220 time-links each iteration of the U-net 210 to a next iteration (seen in the duplicated elements 240, 250 with additional iterations indicated by the ellipsis) so that the model 96 can be trained to transform the time sequences of tropical cyclone track 102, extent 104, pressure 105, and wind speed 106 to time sequences of surface wind field 122, surface rainfall field 124, and surface pressure field 126. The convolutional/deconvolving encoder (U-net) is used to enable image-to-image transformation. Thus, the output fields are produced without using physics equations to model the input fields. Nevertheless, for known situations the architecture 200, with successful training, provides comparable or better accuracy to physics-based models. Note, in one or more embodiments, the encoder is not necessarily an autoencoder, because the outputs (wind, rainfall, and pressure fields 122, 124, 126) are not intended to match the inputs (track 102, extent 104, minimum central pressure 105, and maximum wind speed 106).

Figure 5:
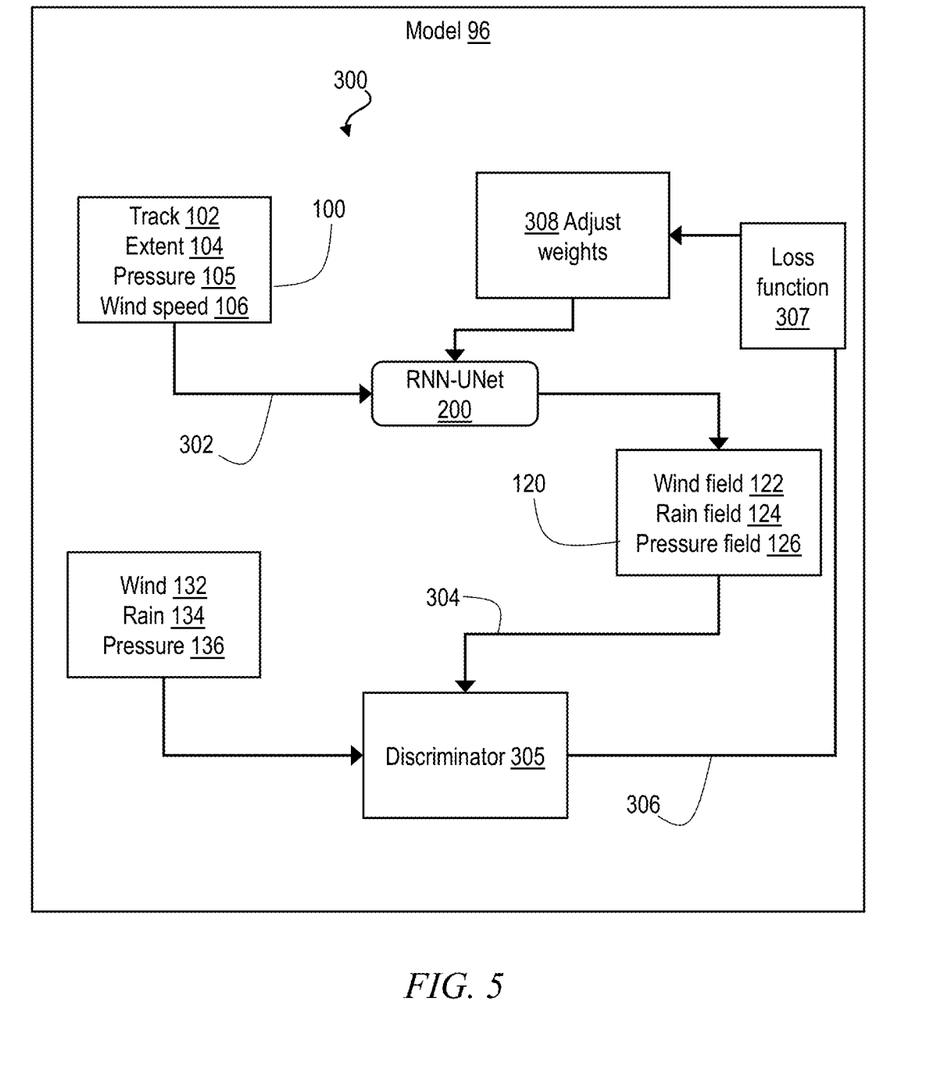
FIG. 5 depicts, in a schematic, training the model of FIG. 3, according to an exemplary embodiment.

FIG. 5 depicts, in a schematic, a method 300 for training the architecture 200 of the model 96. At 302, inputs 100 (e.g., track 102, extent 104, minimum central pressure 105, and maximum wind speed 106) are provided to the architecture 200, which produces outputs 120. Then at 304, the outputs 120 are provided to a discriminator 305, which compares the outputs 122, 124, 126 to real wind, rainfall, and pressure field data 132, 134, 136. At 306, the discriminator 305 returns a loss function 307. At 308, the model 96 then adjusts weights of the architecture 200 in response to the loss function.

Various modes can be employed for implementing the discriminator 305 to train the model 96. For example, in one mode of training, the discriminator 305 compares outputs that are based on real inputs to the real data that corresponds to those real inputs. In this mode of training, the discriminator 305 produces the loss function 307 by calculating mean squared error or mean standard error or any other conventional error measure between the outputs and the real data for the corresponding inputs.

In another mode of training, the discriminator 305 compares outputs (model images) that are based on user-generated inputs to real data (historical images of wind fields and rainfall fields) that comes from real inputs (historical images of tropical cyclone tracks, etc.). In the latter mode of training, the discriminator (e.g., a discriminator as used in a generative adversarial network (GAN)) calculates a probability that the outputs 122, 124, 126 actually come from the real historical data 132, 134, 136; when this probability is at least 50%, the discriminator is considered trained. Based on the comparison, at 306 the discriminator 305 produces the loss function 307 based on a level of confidence whether the outputs 122, 124, 126 are consistent with the real data 132, 134, 136. In other words, the discriminator 305 indicates whether the outputs 122, 124, 126 are acceptably realistic. The loss function 307 gets smaller as the level of confidence gets larger.

Figure 6:
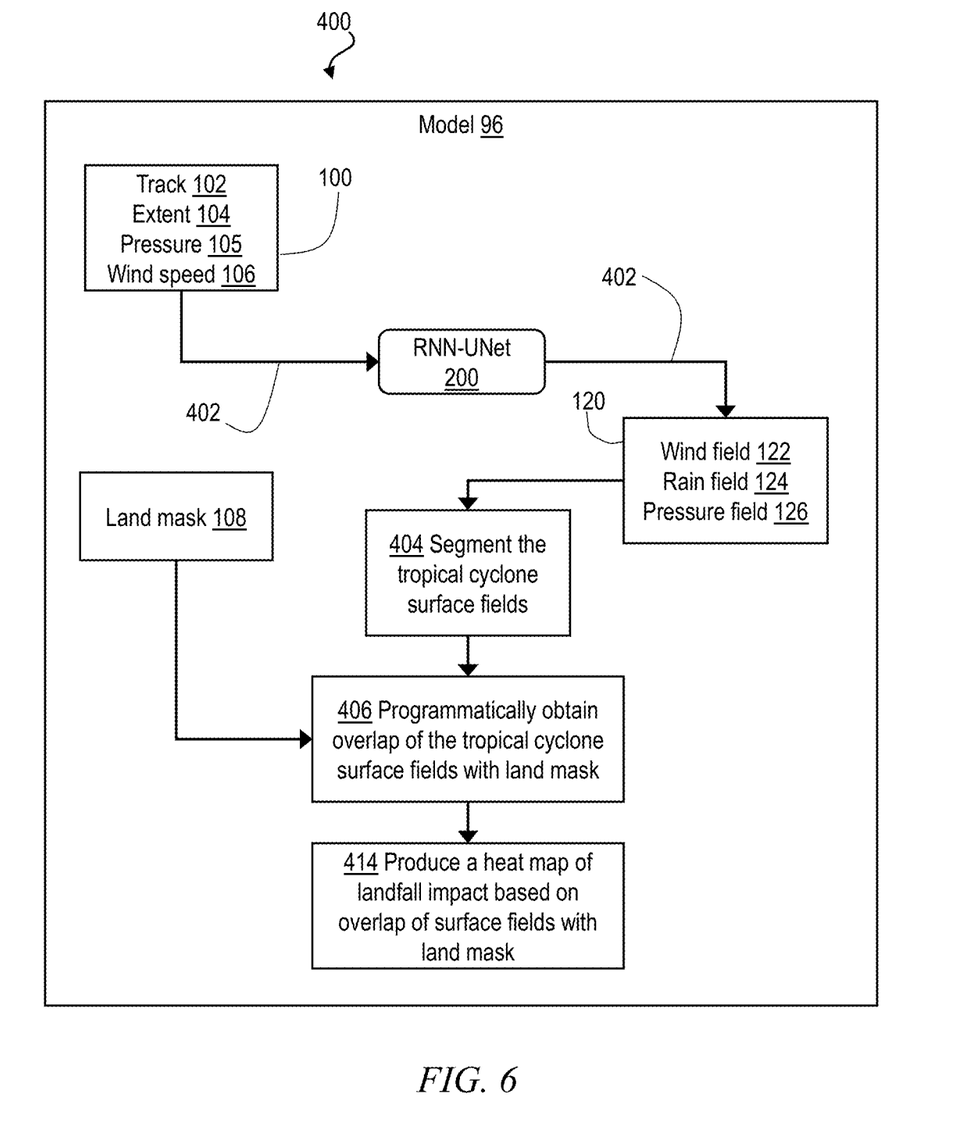
FIG. 6 depicts, in a schematic, principles of tropical cyclone landfall impact assessment, according to an exemplary embodiment.

FIG. 6 depicts, in a schematic, principles of a method 400 for tropical cyclone landfall impact assessment, according to an exemplary embodiment. At 402, generate tropical cyclone surface fields 122, 124, 126 along a specified track 102 for extent 104, minimum central pressure 105, and maximum wind speed 106, using the architecture 200. At 404, segment the tropical cyclone surface fields 122, 124, 126 using, e.g., an Otsu method of background-foreground separation, combined with thresholding. Segmenting the surface fields here means obtaining a "tight"/accurate "outline" of the cyclone for the wind speed/precipitation/pressure surface fields. Since these surface fields are continuous, it will be helpful to be able to say exactly where the most active region of the cyclone is in order to determine what regions are impacted. This can be done with the Otsu method or with thresholding—both of which should give an accurate estimate of the regions with the "highest" wind speed, precipitation, etc. At 406, obtain the overlap of the tropical cyclone surface fields 122, 124, 126 with the land mask 108, e.g., by finding point coordinates within the surface fields that match point coordinates within the land mask. At 414, produce a heat map of landfall impact based on the overlap of the surface fields with the land mask. In this case, "heat map" refers to a color-coded map indicating the intensity of structural damage, flooding, or other impact sustained due to landfall, as opposed to a map of atmospheric temperature.

Figure 7:
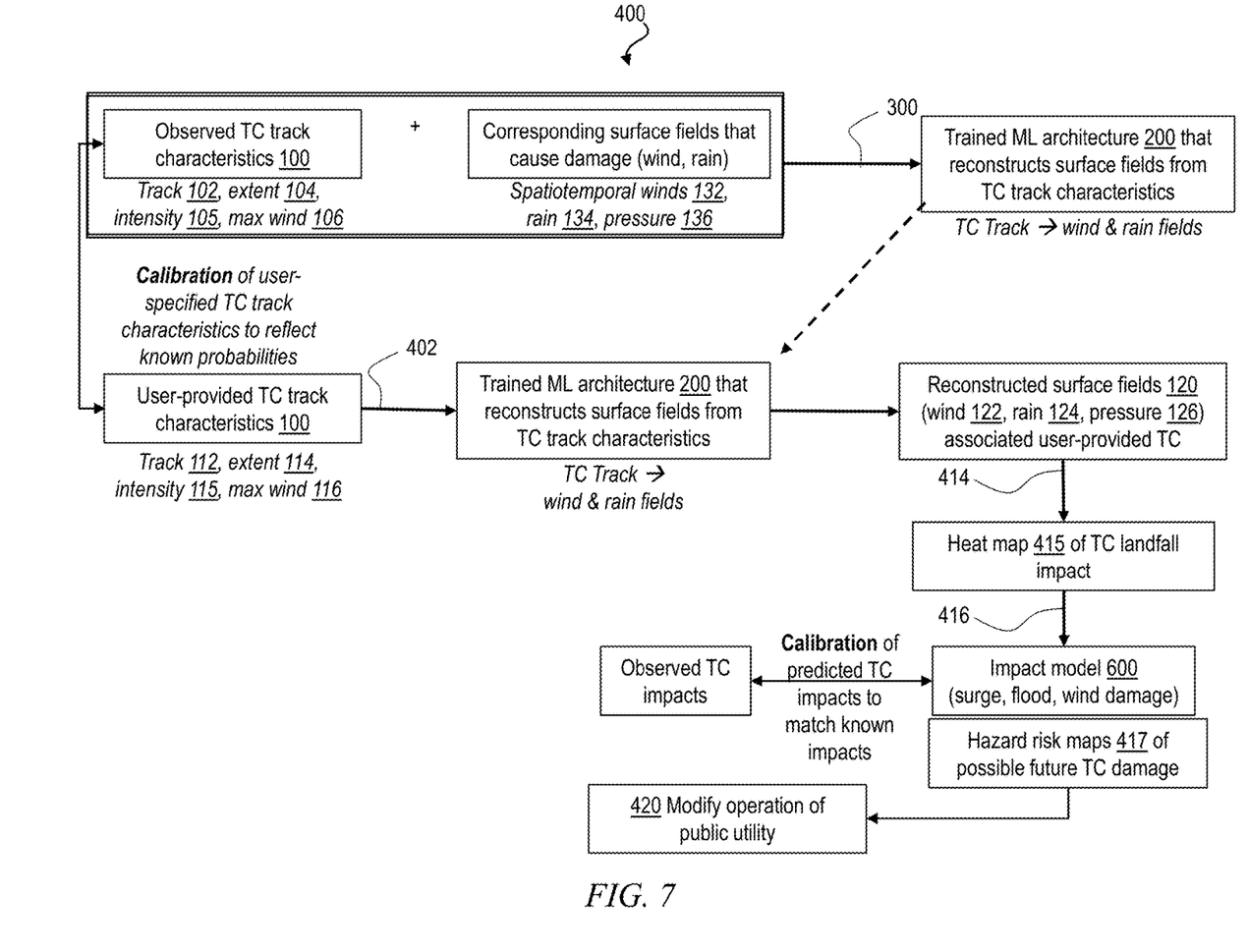
FIG. 7 depicts, in a schematic, details of tropical cyclone landfall impact assessment, according to an exemplary embodiment.
Figure 8:
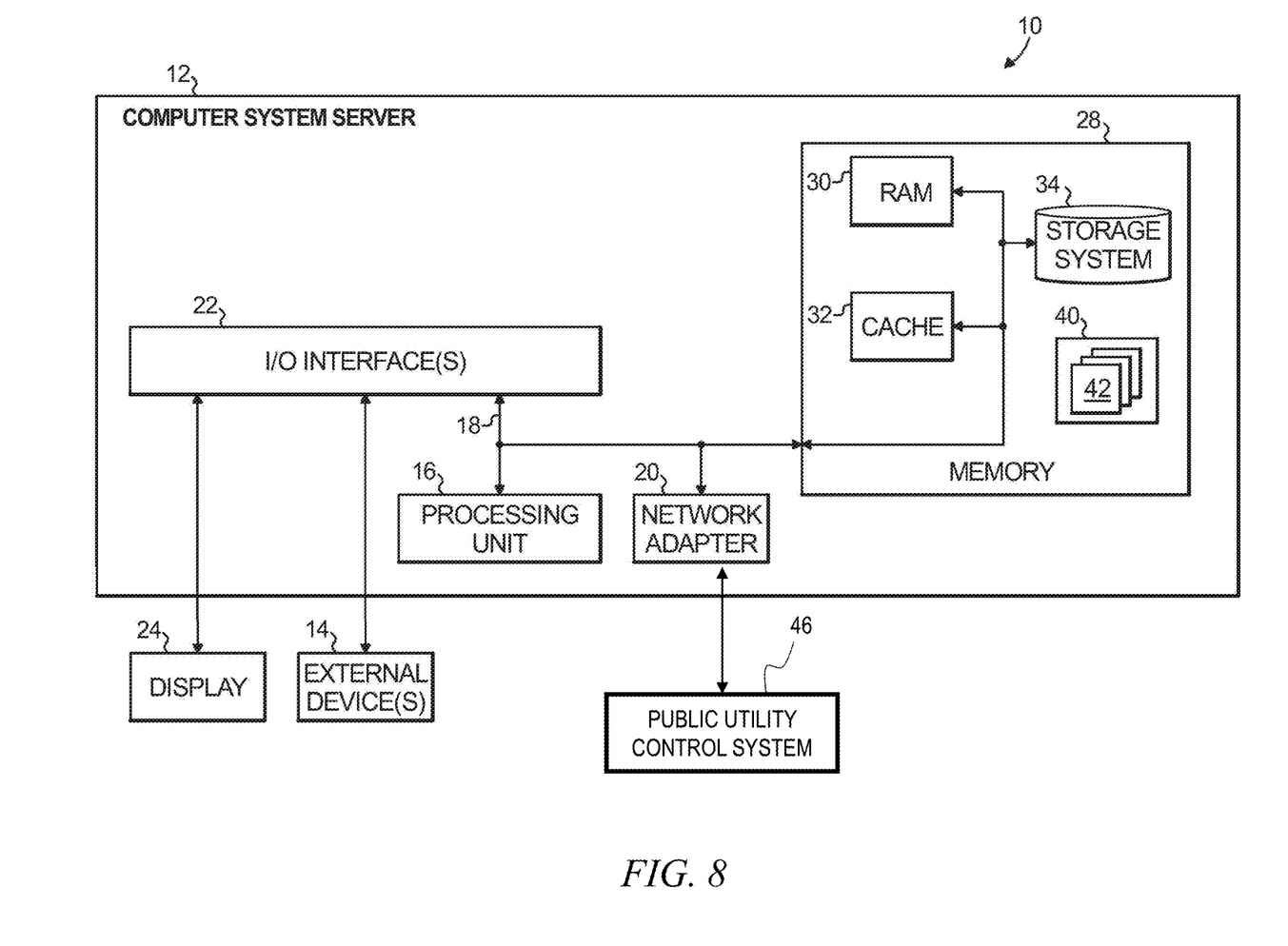
FIG. 8 depicts a computer system that may be useful in implementing one or more aspects and/or elements of the invention, also representative of a cloud computing node according to an embodiment of the present invention.

FIG. 7 depicts, in a non-limiting exemplary schematic, more detailed steps and components of the method 400. At 300, train the architecture 200 using real input data 100 (track 102, extent 104, minimum central pressure 105, maximum wind speed 106) and real output data (surface wind field 132, surface rainfall field 134, surface pressure field 136). At 402, generate modeled output data 120 (surface wind field 122, surface rainfall field 124, surface pressure field 126) by submitting user-provided input data (track 112, extent 114, pressure 115, and wind 116) to the trained architecture 200. At 414, produce a heat map 415 of landfall impact by post-processing the modeled output data according to steps 404 and 406 of FIG. 6. At 416, generate hazard risk maps 417 by providing the heat map of landfall impact to an impact modeling framework/architecture 600, which is further described below. At 420, in response to the hazard risk maps 417, modify operation of a public utility control system 46, generally as shown in FIG. 8.

In one or more embodiments, the impact model 600 includes a machine learning based modelling framework that performs the impact of climate-induced events (using AI/hybrid data-driven and physics-based modelling approach) on a given context; for example, public utilities, enterprise assets, and infrastructure for a given location and time period. The framework automatically curates and ranks data and models (source code) to quantify relevant climate hazards for a specified location, time period, and application context (e.g., impact of flooding, storms, and wildfire on electrical utility operations. Furthermore, in one or more embodiments, it uses knowledge graphs to guide intelligent model and data choice and to enable explainable predictions of the impacts. For example, the impact model 600 includes an image-to-image conversion model, similar to the wind speed generator 130 or the precipitation generator 131, that takes as input an overlay of surface structures and topography (e.g., from aerial photographs) with wind speeds and precipitation (e.g., fields 122, 124, 126 from the model architecture 200), and produces as output a map of estimated dollar values for storm damage. Such a model can be trained on historical photographs of coastal regions before and after tropical cyclone landfalls, along with records of insurance payments for those storms.

In one or more embodiments, the impact model 600 is a physics-based model that is optimized to reproduce historical cyclone impacts using 3-D models of previously affected coastal region topography and surface structures. Such a physics-based model, in one or more embodiments, makes use of fluid dynamic equations or approximations of such equations, e.g., approximations of Navier-Stokes equations for compressible mixed-composition fluids with phase change, in combination with finite element models of structures under pressure loads corresponding to different wind speeds.

In one or more embodiments, the impact model 600 is a statistical model that is trained on historical cyclone damage data, land masks, and tropical cyclone tracks and intensities. Such a statistical model, in one or more embodiments, may be implemented using a machine learning model for which training inputs include tropical cyclone tracks and intensities as well as land masks, and training outputs include dollar values of storm damage.

Given the discussion thus far, it will be appreciated that, in general terms, an exemplary method 400, according to an aspect of the invention, includes, at 300, training a machine learning model, using an image-based knowledge graph of tropical cyclone data, for implementing a surface field modeling architecture that produces images of at least surface wind fields and surface rainfall fields from images of at least tropical cyclone tracks and pressure intensities; and then, at 402, generating model images of a modeled surface wind field and a modeled surface rainfall field by providing images of at least a user-generated tropical cyclone track and pressure intensity to the trained machine learning model.

In one or more embodiments, the tropical cyclone data includes surface wind fields, surface rainfall fields, and at least two of tracks, pressure intensities, extents, and maximum wind speeds.

In one or more embodiments, the method 400 further includes, at 414, generating a hazard risk map of potential tropical cyclone damage in a land area by providing the model images to an impact modeling architecture. In one or more embodiments, the method 400 further includes, at 420, modifying operation of a public utility in response to embedding the generated hazard risk map into automated public utility controls. In one or more embodiments, the generating the hazard risk map further comprises providing to the impact modeling architecture aerial photographs of the land area in addition to the model images.

In one or more embodiments, the surface field modeling architecture 200 comprises a plurality of convolutional layers 212 flowing to a recurrent neural network 220 and a plurality of deconvolutional layers 214 flowing from the recurrent neural network. In such embodiments, the method 400 further includes providing the images of the user-generated tropical cyclone track and pressure intensity as input to the convolutional layers; and obtaining the model images as output from the deconvolutional layers. In one embodiment, over time, the recurrent neural network can learn future tropical cyclone track and pressure intensity from historical user-generated data.

In one or more embodiments, the method 400 further includes, at 300, training the surface field modeling architecture by comparing historical images of surface wind fields and surface rainfall fields to model images produced by the surface field modeling architecture from historical images of tropical cyclone tracks and pressure intensities that correspond to the historical images of surface wind fields and surface rainfall fields. In one or more embodiments, comparing of images comprises comparing the images by a generative adversarial network discriminator.

One or more embodiments of the invention, or elements thereof, can be implemented in the form of an apparatus including a memory and at least one processor that is coupled to the memory and operative to perform exemplary method steps, or in the form of a non-transitory computer readable medium embodying computer executable instructions which when executed by a computer cause the computer to perform exemplary method steps. FIG. 8 depicts a computer system that may be useful in implementing one or more aspects and/or elements of the invention, also representative of a cloud computing node according to an embodiment of the present invention. Referring now to FIG. 8, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Other communication can occur with an external device such as a public utility control system 46. For example, the control system 46 can operate breakers or valves to shut off electric, water, or gas supplies; can open and close flood gates, etc. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 8, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 8) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   training a machine learning model, using an image-based knowledge graph of tropical cyclone data, for implementing a surface field modeling architecture that produces images of at least surface wind fields and surface rainfall fields from images of at least tropical cyclone tracks and pressure intensities;
   preserving low-level features between corresponding initial convolutional layers and deep deconvolving layers of a convolutional encoder/transpose convolutional decoder via skip connections, the low-level features learned by the initial convolutional layers, and giving the deeper deconvolving layers direct access to the low-level features, the deeper deconvolving layers being layers that process data generated by at least one of the initial convolutional layers; and generating model images of a modeled surface wind field and a modeled surface rainfall field by providing images of at least a user-generated tropical cyclone track and pressure intensity to the trained machine learning model.

2. The method of claim 1, wherein the tropical cyclone data includes surface wind fields, surface rainfall fields, and at least two of tracks, pressure intensities, extents, and maximum wind speeds.

3. The method of claim 1, further comprising:
generating a hazard risk map of potential tropical cyclone damage in a land area by providing the model images to an impact modeling architecture.

4. The method of claim 3, further comprising:
modifying operation of a public utility in response to embedding the generated hazard risk map into automated public utility controls.

5. The method of claim 3, wherein the generating of the hazard risk map further comprises providing to the impact modeling architecture aerial photographs of the land area in addition to the model images.

6. The method of claim 1, wherein the surface field modeling architecture comprises a plurality of convolutional layers flowing to a recurrent neural network and a plurality of deconvolutional layers flowing from the recurrent neural network;
the method further comprising:
providing the images of the user-generated tropical cyclone track and pressure intensity as input to the convolutional layers; and
obtaining the model images as output from the deconvolutional layers.

7. The method of claim 6, further comprising training the surface field modeling architecture by comparing historical images of surface wind fields and surface rainfall fields to model images, wherein the model images are produced by the surface field modeling architecture from historical images of tropical cyclone tracks and pressure intensities that correspond to the historical images of surface wind fields and surface rainfall fields.

8. The method of claim 7, wherein the comparing of the images comprises comparing the images by a generative adversarial network discriminator.

9. A computer readable storage medium that embodies computer executable instructions, which when executed by a computer cause the computer to perform a method comprising:
training a surface field modeling architecture, using an image-based knowledge graph of tropical cyclone data, to produce images of at least surface wind fields and surface rainfall fields from images of at least tropical cyclone tracks and pressure intensities;
preserving low-level features between corresponding initial convolutional layers and deep deconvolving layers of a convolutional encoder/transpose convolutional decoder via skip connections, the low-level features learned by the initial convolutional layers, and giving the deeper deconvolving layers direct access to the low-level features, the deeper deconvolving layers being layers that process data generated by at least one of the initial convolutional layers; and
generating model images of a modeled surface wind field and a modeled surface rainfall field by providing images of at least a user-generated tropical cyclone track and pressure intensity to the trained surface field modeling architecture.

10. The computer readable storage medium of claim 9, wherein the tropical cyclone data includes surface wind fields, surface rainfall fields, and at least two of tracks, pressure intensities, extents, and maximum wind speeds.

11. The computer readable storage medium of claim 9, wherein the method further comprises:
generating a hazard risk map of potential tropical cyclone damage in a land area by providing the model images to an impact modeling architecture.

12. The computer readable storage medium of claim 11, wherein the method further comprises:
modifying operation of a public utility in response to embedding the generated hazard risk map into automated public utility controls.

13. The computer readable storage medium of claim 11, wherein the generating the hazard risk map further comprises providing to the impact modeling architecture aerial photographs of the land area in addition to the model images.

14. The computer readable storage medium of claim 9, wherein the surface field modeling architecture comprises a plurality of convolutional layers flowing to a recurrent neural network and a plurality of deconvolutional layers flowing from the recurrent neural network;
the method further comprising:
providing the images of the user-generated tropical cyclone track and pressure intensity as input to the convolutional layers; and
obtaining the model images as output from the deconvolutional layers.

15. The computer readable storage medium of claim 14, wherein the method further comprises training the surface field modeling architecture by comparing historical images of surface wind fields and surface rainfall fields to model images produced by the surface field modeling architecture from historical images of tropical cyclone tracks and pressure intensities that correspond to the historical images of surface wind fields and surface rainfall fields.

16. The computer readable storage medium of claim 15, wherein comparing of images comprises comparing the images by a generative adversarial network discriminator.

17. An apparatus comprising:
a memory embodying computer executable instructions; and
at least one processor, coupled to the memory, and operative by the computer executable instructions to perform a method comprising:
training a surface field modeling architecture, using an image-based knowledge graph of tropical cyclone data, to produce images of at least surface wind fields and surface rainfall fields from images of at least tropical cyclone tracks and pressure intensities;
preserving low-level features between corresponding initial convolutional layers and deep deconvolving layers of a convolutional encoder/transpose convolutional decoder via skip connections, the low-level features learned by the initial convolutional layers, and giving the deeper deconvolving layers direct access to the low-level features, the deeper deconvolving layers being layers that process data generated by at least one of the initial convolutional layers; and
generating model images of a modeled surface wind field and a modeled surface rainfall field by providing images of at least a user-generated tropical cyclone track and pressure intensity to the trained surface field modeling architecture.

18. The apparatus of claim 17, wherein the tropical cyclone data includes surface wind fields, surface rainfall fields, and at least two of tracks, pressure intensities, extents, and maximum wind speeds.

19. The apparatus of claim 17, further comprising:
generating a hazard risk map of potential tropical cyclone damage in a land area by providing the model images to an impact modeling architecture.

20. The apparatus of claim 17, wherein the surface field modeling architecture comprises a plurality of convolutional layers flowing to a recurrent neural network and a plurality of deconvolutional layers flowing from the recurrent neural network;
the method performed by the processor further comprising:
providing the images of the user-generated tropical cyclone track and pressure intensity as input to the convolutional layers; and
obtaining the model images as output from the deconvolutional layers.

* * * * *